(No Model.)
R. T. MOREHOUSE.
INSTRUMENT FOR OBTAINING ALTITUDES AT SEA.
No. 534,225. Patented Feb. 12, 1895.
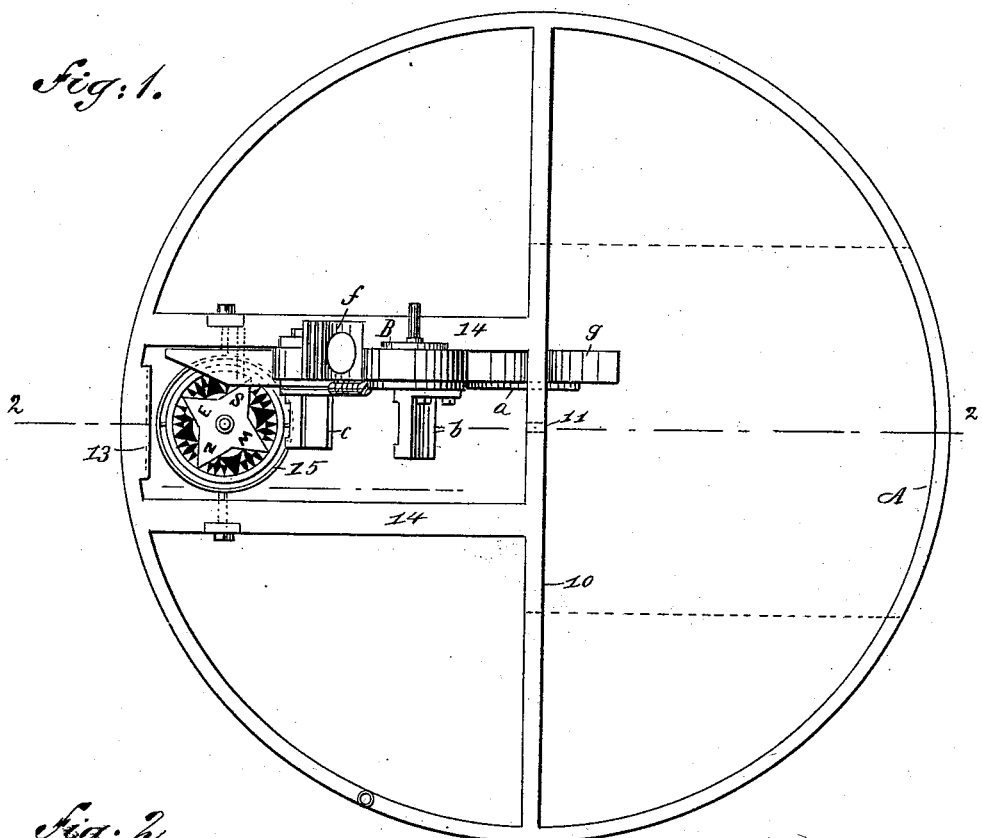
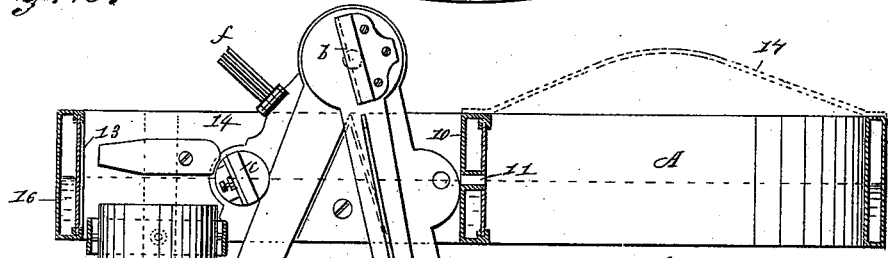
WITNESSES:
Chas. Nida
J. Fred Acker
INVENTOR
R. T. Morehouse
BY
Munn & Co
ATTORNEYS.

UNITED STATES PATENT OFFICE.

REUBEN TUCKER MOREHOUSE, OF SANDY COVE, CANADA, ASSIGNOR OF ONE-HALF TO GEORGE DICK, OF BROOKLYN, NEW YORK.

INSTRUMENT FOR OBTAINING ALTITUDES AT SEA.

SPECIFICATION forming part of Letters Patent No. 534,225, dated February 12, 1895.

Application filed August 18, 1894. Serial No. 520,702. (No model.)

*To all whom it may concern:*

Be it known that I, REUBEN TUCKER MOREHOUSE, of Sandy Cove, in the county of Digby, Province of Nova Scotia, and Dominion of Canada, have invented a new and Improved Instrument for Obtaining Altitudes at Sea, of which the following is a full, clear, and exact description.

My invention relates to an instrument for obtaining altitudes at sea, or an azimuth instrument, and it has for its object to construct a device to be used in connection with a sextant, whereby observations may be taken at sea when the horizon is obscure or not visible, as well as when the horizon is perfectly clear, the device employed in connection with the sextant being constructed to show a true liquid artificial horizon.

Another object of this invention is to provide an attachment whereby while an observation is being taken, the sun's correct magnetic bearing, or the sun's azimuth, may be at the same time correctly obtained.

Another object of this invention is to provide an attachment to a sextant of the character above set forth, from which the sextant may be readily detached and used in the ordinary manner when desired.

The invention consists in the novel construction and combination of the several parts, the leading feature of which is a hollow band adapted to encircle the head and having a continuous channel partly filled with a liquid, and having a glazed panel, and provided with a central sight orifice, whereby the level position may be sighted from a point within the band, which thus forms a sort of artificial horizon to be used with a sextant and compass, as will be hereinafter fully set forth and pointed out in the claims.

Reference is to be had to the accompanying drawings, forming a part of this specification, in which similar figures and letters of reference indicate corresponding parts in all the views.

Figure 1 is a plan view of the instrument. Fig. 2 is a transverse section, taken practically on the line 2—2 of Fig. 1; and Fig. 3 is a front elevation of a portion of the cross bar in which the eye opening is located.

In carrying out the invention a tubular band A is employed, which may be of any desired shape, but is preferably made circular and provided with a central cross bar 10, also tubular, and communicating with the chamber in the band proper. In the exact center of the cross bar an eye opening 11 is located, and around this eye opening a panel 12, is placed, of a transparent material, and immediately in the line of sight from the eye opening 11, or immediately opposite said eye opening, a second transparent panel 13 is formed in the inner face of the band A. At each side of these two openings the band and the cross bar 10 are connected by a beam or bar 14. The sextant B is hung upon one of these beams or bars 14, at right angles to the cross bar 10, with the fixed mirror in proper alignment with the sight opening, which is the panel 13 and the eye opening 11. The sextant is of the usual construction, its sight being, however, removed, and the place where the sight is usually located being brought in horizontal alignment with the eye opening 11, as shown in Fig. 2.

The sextant embraces, as usual, the pivot arm or movable limb *a*, a reflecting mirror *b*, the fixed mirror *c*, the graduated arc *d*, the vernier *e*, the series of colored glasses *f* and the frame *g*. Between the sextant and the sight opening in the band, a compass 15 is swung in binnacle bearings. An artificial horizon is produced in the band, visible at the sight opening, by introducing into the chamber within the band a liquid 16, preferably oil, as illustrated in Fig. 2, the liquid being made to enter also the cross bar 10, and when the liquid is at a proper level at the eye opening visible through the panel 12, it will be at the level of the sight opening represented by the panel 13, and will represent an artificial horizon, from which observations may be taken as correctly as from a natural horizon.

The instrument is intended to be placed over the head of the observer, the head passing up between the cross bar 10 and the side of the band opposite that containing the sextant, and in order that this instrument may be conveniently worn, the portion thereof into which the head is introduced is covered by a strip of canvas 17, or other material, A suitable gage may be provided at the eye opening to show when the liquid is at the exact level of the eye. Another method of leveling the liquid to the eye consists in moving the index bar or movable limb of the sextant off the arc, to the amount of the dip according to the height of the eye above the sea, and then bringing the true and reflected horizon in a straight line with the liquid in the artificial horizon. When the liquid in the band has been leveled to coincide with the natural horizon, a suitable gage mark, as heretofore stated, may be placed at the eye opening, or the liquid may be poured off into a vial and its level marked. Thus, at any time should the liquid forming the artificial horizon be spilled, the proper amount can be added by pouring a liquid into the vial, and filling up to the level mark.

The sight opening 13 of the artificial horizon is directly in front of the sextant, and the eye opening is so placed as to bring the line of sight directly over the center of the compass card to the sun's center reflected in the artificial horizon, which will give the sun's correct magnetic bearing, or sun's azimuth, at the time of observation. The altitudes are measured by the sextant to the surface of the liquid shown in the artificial horizon, which is the true horizon line, and the bearings of objects can also be taken at the same time, all in the usual manner.

The instrument is placed over the head, and supported by the canvas, as heretofore stated, the eye is brought to the sight opening 11, and the sight is directed through the horizon glass of the sextant to the reflected sun in the artificial horizon, at the same time passing over the center of the compass card to the sun's center in the said artificial horizon.

In distinguishing my invention from devices which employ a spirit level, in which the position of an air bubble in a short tube indicates the level, I would state, that such devices are impracticable on ship board, because a vessel at sea is never still enough to use such a device, and the air bubble has a motion so quick and sensitive to the rocking or careening of the vessel that it will not stand still long enough for an observation, but is continually shifting out of sight. With my continuous artificial liquid horizon, the shifting of the level in no way affects the taking of the observation, as the fluctuating level may be followed with the eye at the sight hole, for such liquid level while shifting somewhat in the glazed panel, never disappears, thus enabling the observer to level the instrument through a much greater range of the ship's movement. This is so by reason of the fact that the liquid level is a continuous one extending all around the head with a relatively large glazed panel to show a considerable vertical variation in the surface level of the liquid.

Having thus described my invention, I claim as new and desire to secure by Letters Patent—

1. In an instrument for obtaining altitudes, a continuous hollow band adapted to contain an artificial liquid horizon and to encircle the head, and having a transparent wall on one side, and a central sight hole, substantially as and for the purpose described.

2. In an instrument for obtaining altitudes, a continuous hollow band adapted to contain an artificial liquid horizon and to encircle the head, and having a transparent wall on one side, and diametrical bar having a central sight hole substantially as and for the purpose described.

3. In an instrument for obtaining altitudes, a continuous hollow band adapted to contain an artificial liquid horizon and to encircle the head, and having a transparent wall on one side, and a diametrical hollow bar in open communication with the hollow band, and having in the center a sight hole substantially as and for the purpose described.

4. An instrument for obtaining altitudes, consisting of a continuous hollow band adapted to contain an artificial liquid horizon and to encircle the head, and having a transparent wall on one side and a central sight hole, and a sextant interposed between the said sight hole and the transparent wall, substantially as and for the purpose described.

5. An instrument for obtaining altitudes consisting of a continuous hollow band adapted to contain an artificial liquid horizon and to encircle the head, and having a transparent wall on one side and a central sight hole, and a sextant and compass interposed between the sight hole and transparent wall and supported upon the frame work substantially as and for the purpose described.

REUBEN TUCKER MOREHOUSE.

Witnesses:
J. FRED. ACKER,
C. SEDGWICK.